United States Patent [19]

Samartgis

[11] Patent Number: 5,713,100
[45] Date of Patent: Feb. 3, 1998

[54] BIFURCATED BACKING STRIP FOR USE IN WINDSCREEN WIPER BLADE ASSEMBLIES

[75] Inventor: Jim Samartgis, Eltham, Australia

[73] Assignee: Trico Products Corporation, Buffalo, N.Y.

[21] Appl. No.: 506,331

[22] Filed: Jul. 24, 1995

[51] Int. Cl.$^6$ ............................ B60S 1/04; B60S 1/38
[52] U.S. Cl. ........................ 15/250.452; 15/250.451; 15/250.453
[58] Field of Search ............... 15/250.452, 250.453, 15/250.454, 250.48, 257.01, 250.31, 250.44, 250.361

[56]  References Cited

U.S. PATENT DOCUMENTS

| 3,386,123 | 6/1968 | Oishei et al. | 15/250.452 |
|---|---|---|---|
| 3,659,310 | 5/1972 | Rosen | 15/250.452 |
| 3,702,490 | 11/1972 | Quinlan et al. | 15/250.452 |
| 3,795,935 | 3/1974 | Roberts | 15/250.453 |
| 4,075,731 | 2/1978 | Harbison et al. | 15/250.452 |

FOREIGN PATENT DOCUMENTS

| 870705 | 5/1971 | Canada | 15/250.453 |
|---|---|---|---|
| 7017 | 1/1980 | European Pat. Off. | 15/250.454 |
| 1160918 | 8/1958 | France | 15/250.453 |
| 3208749 | 10/1982 | Germany | 15/250.453 |
| 2243991 | 11/1991 | United Kingdom | 15/250.453 |

*Primary Examiner*—Gary K. Graham
*Attorney, Agent, or Firm*—Joseph G. Nauman

[57]  ABSTRACT

A bifurcated backing member (20) for use in a wiper blade assembly, the bifurcated backing member (20) being formed from an elongated strip (10) having a centrally thinned section (11) which is then laterally displaced such that the edge (14) of the thinned section (11) coincides with the adjacent edges (15a, 15b) of the remaining parts of the elongated strip (10), the elongated strip (10) then being bent around the thinned section 11 to form the bifurcated backing member with substantially parallel legs (13).

7 Claims, 1 Drawing Sheet

BIFURCATED BACKING STRIP FOR USE IN WINDSCREEN WIPER BLADE ASSEMBLIES

FIELD OF THE INVENTION

This invention relates to a windscreen wiper blade assembly, and particularly to improvements in a backing strip or twin rail configuration for use in wiper blade assemblies.

BACKGROUND

Wiper blade assemblies comprise a wiper element of rubber or other elastomeric material and a pair of rails or backing strips, each of which fits into a longitudinally extending groove in an upper region of the wiper element. The grooves normally extend laterally into the wiper element from opposite sides such that a web of the wiper element is located between the inner longitudinal edges of the rails or strips. The rails or strips are formed from a suitable metal such that they readily flex to allow the wiper element to conform to the contour of a windscreen but have limited flexibility in a direction transverse thereto to provide some rigidity for the wiper blade assembly. The wiper blade assembly is normally connected to a drive mechanism by a harness including one or more yokes with claws at either end that clip over the outer edges of the backing strips or rails. It is generally necessary that there be some mechanism for fixing the backing strips or rails relative to the wiper element and some means of fixing the wiper blade assembly relative to the claws of the supporting harness so that in use the assembly stays together. It is, however, also important for the wiper blade assembly to be capable of release from the claws of the harness for service or replacement when the wiper element is worn.

The rails or backing strips of a wiper blade assembly are conventionally formed in one of two ways; either as two parallel, but unconnected strips which are held in place in the wiper element by means of one or two end clips disposed at the ends of the wiper element, or as a single "U" shaped element comprising two parallel strips conjoined at one end and held in place in the wiper construction by an end clip or the like at the other end. Wiper blade assemblies are conventionally sold with the backing strips or rails in place in the wiper element, however it is possible that the backing strips could be incorporated into the wiper element at the time of fitting the wiper element to the wiper blade assembly.

The "U" shaped rail constructions have proved particularly problematic to produce. To stamp a "U" shaped element having two long, thin parallel legs and only a small gap therebetween is very difficult. Aside from the accuracy required, considerable wastage of the stamped out middle region in the "U" shape occurs. Moreover, to form a "U" shaped rail construction by bending an elongated piece of metal about an axis in which it is intended in use to have only limited flexibility is also difficult since the bending of the metal strip may result in cracking, warping or breaking of the fragile end region being bent. Although apertures in the rail in the portions to be bent aid the flexibility of the rail, they also add to its fragility.

One twin rail arrangement of the prior art is described in U.S. Pat. No. 3,696,497 (Quinlan). In one disclosed embodiment in this specification, the backing strip is formed from a single, strip-like piece of material which is stamped out and then formed into a twin rail arrangement by being bent separately about two weakened portions in the single strip so as to form two U shaped ends. Detents may be also stamped into the strip so as to provide a location for the claws of a wiper harness which grips the wiper element and twin rails in use. With reference to FIGS. 33, 34 and 35 of this disclosure, it can be seen that the claws of the supporting harness can be located in the detents D and D' respectively in FIGS. 33 and 34 and between the detents D" in FIG. 35. Thus, in use, to remove the supporting harness claws they must be released from the detents D, D' and D" by putting inwardly directed pressure on both sides of the wiper element and twin rail assembly. It will be appreciated that because the wiper element is, to a large extent, not compressible, these arrangements are not capable of disassembly.

In a similar disclosure in U.S. Pat. No. 3,659,310 (Rosen) a bifurcated spine element is provided having thinner regions at its end regions than intermediate its ends. This arrangement relies on the nature of the material of the rails and the resilience of the harness claws to prevent the rails from being removed from the wiper element. This disclosure relies on the claws of the harness to hold the spine in place in the wiper element and again, removal of these claws will be difficult owing to the need to inwardly compress the wiper element adjacent the notches 24 to release the claws.

Thus, it is an object of this invention to provide an alternative windscreen wiper blade assembly to those described in the prior art and particularly, to provide a wiper element incorporating a "U" shaped rail arrangement which alleviates some of the problems of prior art arrangements including the need to rely on the harness claws to maintain the rails in situ in the wiper element in use and to compress the wiper element itself to enable release of the harness claws.

SUMMARY OF INVENTION

To this end, there is provided a bifurcated backing member for a wiper element, said bifurcated backing member being adapted to seat within said wiper element and being characterized in that at least one end region is formed by laterally displacing a portion of an elongate strip with respect to body portions of the strip on either side of the laterally displaced portion, and bending said elongate strip about said laterally displaced portion to form said bifurcated backing member having a U-Shape with said body portions forming legs of the U-Shape.

This invention is predicated on the discovery that the lateral displacement of a portion of the elongate strip allows this portion to be effectively used to maintain the backing member in place with respect to the wiper element in use. Displacement laterally of a portion of the backing member also provides advantages in the formation of the backing member as will become evident.

In a preferred form of the invention the portion of the elongate strip to be laterally displaced is thinned with respect to the body of the elongate strip. This may be done in the initial stamping of the elongate strip or by any other suitable method. Such thinning of the portion of the elongate strip to be laterally displaced further assists the elongate strip to endure being bent into a "U"-shaped form. Preferably the thinned portion is formed in a ratio of thickness to width of as close as is possible to 1:1 since this further prevents the thinned portion from buckling or cracking during subsequent formation steps. Ranges of width to thickness ratio which may be acceptable are 2.0:0.5 to 0.5:2.0.

In a further preferred embodiment of the invention the portion of the elongate strip to be laterally displaced is preformed so as to include one or more wiper element retention means which in use in the bifurcated backing member serve to retain the wiper element relative to said backing member. Conveniently, the retention means may be one or more transversely extending barb means adapted to engage the resilient central web of the wiper element thereby restricting any relative movement between the wiper element and the backing member. In particular, the portion of the backing member comprising the one or more barb means may be laterally displaced with respect to the body of the elongate strip such that an edge of the strip intermediate the barb means and an unthinned portion of the strip, or intermediate two barb means is aligned with an edge of the strip which is unthinned. It will be appreciated that in forming the bifurcated backing member, the elongate strip comprising barb means must be bent so that the barbs are located on inner edges of the backing member so as to engage the wiper element.

Preferably barb means are formed in two regions of the laterally displaced portion of the elongate strip remote from each other and are located so that, when the strip is bent so as to form a bifurcated member, the barb means are opposed to each other and intersect the barb means on the opposed side of the bifurcated member. This results in the creation of a pincer-like effect of the bifurcated backing member on the wiper element between the two arms of the backing member.

The elongate strip may also be stamped so as to include notches adapted to locate claws of a yoke of the wiper assembly when it is fully constructed.

In a second aspect of the invention there is provided a method of forming a bifurcated backing member for use in a windscreen wiper assembly comprising laterally displacing at least one portion of an elongate strip with respect to body portions of the strip on either side of said at least one portion, and deforming said elongate strip about said at least one laterally displaced portion such that a said bifurcated member is formed with said body portions disposed substantially parallel to each other.

Preferably, the at least one portion of the elongate strip to be laterally displaced is thinned with respect to the body of the elongate strip. More preferably the thinned portion is formed by stamping or other suitable means so as to have a width to thickness ratio in the range of 2.0:0.5 to 0.5:2.0. The thickness to width ratio is most desirably in the ratio of as close as possible to 1:1 since it has been found that this ratio is optimum for the purposes of deforming the elongate strip into a bifurcated arrangement without cracking or warping the thinned, laterally displaced portion.

The elongate strip may also be preformed so as to include wiper element retention means which in use serve to act upon the wiper element in a pincer like action thereby preventing relative movement between the wiper element and the bifurcated backing member. Preferably, the lateral displacement of the thinned portion of the elongate strip is such that the edge intermediate the barb means and the unthinned portion of the elongate strip, or between two barb means is aligned with the edge of the unthinned body of the elongate strip. In this way the barb means extend transversely of the elongate strip and so compress the wiper element between them when in use in the bifurcated form.

Notches adapted to receive the claws of the yoke of a wiper assembly may also be formed in the elongate strip if desired.

In a further aspect of the invention there is provided a wiper blade assembly for use in a windscreen wiper construction, said wiper blade assembly comprising a wiper element, and adapted to seat within a pair of opposed longitudinally extending grooves in an upper region of said wiper element, a bifurcated backing member characterised in that at least one end region is formed by laterally displacing a portion of an elongate strip with respect to the body of the strip, and bending said elongate strip into a "U"-shaped member about said laterally displaced portion so as to form said bifurcated backing member.

PREFERRED EMBODIMENT

One preferred embodiment of the invention will now be described with reference to the accompanying illustrations in which.

Figure 1:
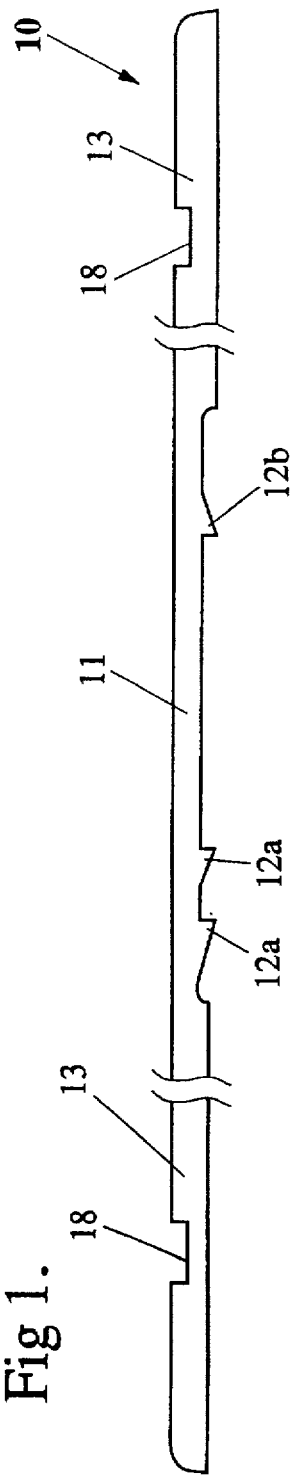
FIG. 1 shows a plan view of an elongate strip stamped for formation into a bifurcated backing member in accordance with the invention.
Figure 3:
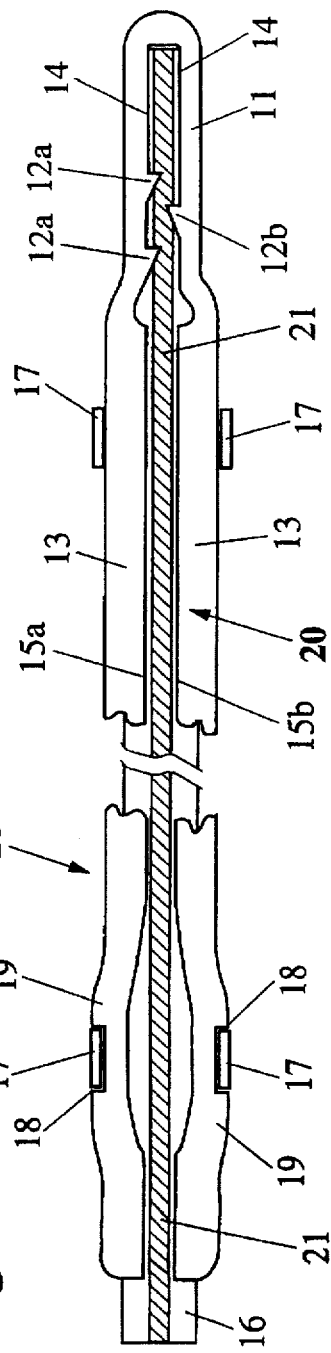
FIG. 3 illustrates a plan view of a bifurcated backing member in accordance with the invention in location in a wiper element.

With reference to FIG. 1, it will be seen that the elongate strip 10 has been stamped so as to comprise a thinned portion 11 with body portions 13 intermediate its ends on either side. The thinned portion 11, in turn, has been formed with barbs 12a and 12b at remote ends of the thinned portion. The elongate strip has also been preformed with notches 18 adapted to retain the claws of a supporting harness. It will be apparent that elongated strips in the configuration shown in FIG. 1 can be stamped from a suitable metal sheet without any significant manufacturing difficulty. The elongated strips 10 have a width no greater than the width of the body portions 13 because the barbs 12a, 12b do not extend beyond the edge line 15a, 15b intended to form the inner edges of the bifurcated member legs (FIG. 3). Thus the only wasted metal in production is the portions cut out for the notches 18 and for the thinned section 11.

Figure 2:
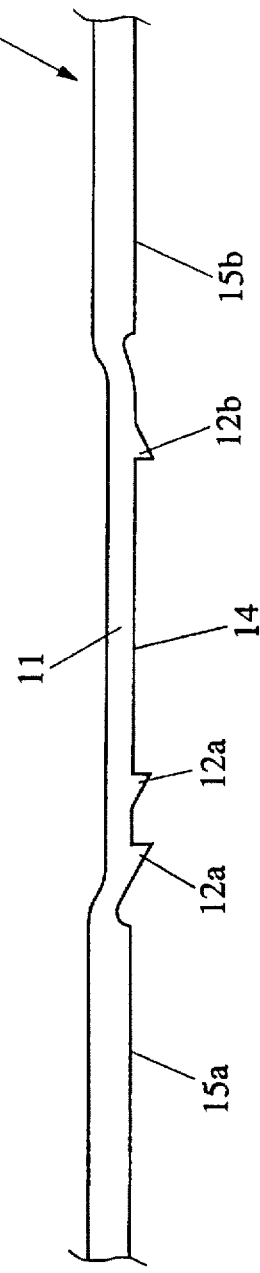
FIG. 2 illustrates a plan view of an elongate member, a portion of which has been laterally displaced.

In FIG. 2, it will be appreciated that the thinned portion, 11 of the elongate strip 10 has been laterally displaced with respect to the remainder of the elongate strip 10 so that the edge 14 of the thinned portion between the barbs 12a and 12b is aligned with the edge 15a, 15b of the body portions 13 of the elongate strip.

In FIG. 3 the bifurcated backing member 20 has now been formed and is shown in assembly with a wiper element 16. The elongate strip 10 has been deformed about the thinned portion 11 intermediate the barbs 12a and 12b so that the barbs 12a and 12b are opposed to each other but intersect the barb means on the opposed arm of the now bifurcated backing member. The barbs 12a and 12b act as a pincer arrangement to engage the central web 20 of the wiper element 16 interposed between the two legs formed by the body portions 13 so as to prevent relative movement between the wiper element 16 and the bifurcated backing member 20. The body portions 13 of the elongate strip 10 are now substantially parallel to each other. Claws 17 of a supporting harness are adapted for location in notches 18 in portions 19 of the backing member 20 which have been displaced outwardly as illustrated. When disassembly of the wiper element is required, this may be achieved by placing inward pressure on both portions 19 which move inwardly, thereby disengaging the claws 17. As shown in FIG. 3, the harness claw 17 at the right hand end of the drawing does not need to be retained in a notch or recess 18. It will be apparent from the foregoing that the wiper element 16 is retained relative to the packing member 20 by the barbs 12a, 12b and the harness is retained relative to the backing member 20 by claws 17 engaged in the recesses or notches 18. In this manner the need to use an end clip or the like is avoided. The displacement of the body portions 19 to the form shown in FIG. 3 may be done simultaneous with the displacement of the thinned section 11 as shown in FIG. 2 or at some other stage.

It will be appreciated that FIGS. 1, 2 and 3 demonstrate in sequence the preferred method of formation of the bifurcated backing member according to the invention which is illustrated in use in FIG. 3.

The bifurcated backing member as described in this specification can be varied within the scope of the invention, for example by the formation of "U"-shaped end regions at both ends of the backing member requiring two thinned portions and two deformation steps to achieve a member having substantially parallel arms. Another variation could include both the number and arrangement of barbs formed in the elongate strip to secure the backing strip against the wiper element.

It can be seen that this invention provides a unique alternative to "U" shaped backing strips of the prior art and in particular has the added advantage of providing means whereby relative movement between the backing strip and the wiper rubber is avoided without the requirement of using end clips.

I claim:

1. A bifurcated backing member for a wiper element, said bifurcated backing member being adapted to seat within said wiper element and being formed from an elongate strip having spaced apart body portions and in that at least one end region formed by laterally displacing a portion of said elongate strip with respect to said body portions of the strip on either side of the laterally displaced portion, and said elongate strip being bent about said laterally displaced portion to form said bifurcated backing member into a U-Shape with said body portions forming legs of the U-Shape, said elongate strip including retention means located on said laterally displaced portion and which in use in the bifurcated backing member retain said wiper element relative to said backing member.

2. A bifurcated backing member according to claim 1 wherein said laterally displaced portion has a width less than the width of the body portions prior to being laterally displaced.

3. A bifurcated backing member according to claim 2 wherein said laterally displaced portion has a width to thickness ratio in the range of 2.0:0.5 to 0.5:2.0.

4. A bifurcated backing member according to claim 3 wherein said laterally displaced portion has a width to thickness ratio of about 1.0:1.0.

5. A bifurcated backing member according to claim 1 wherein said retention means comprises at least one barb extending laterally from a longitudinal edge of said elongate strip and adapted in use to engage into said wiper element.

6. A bifurcated backing member according to claim 1 wherein said elongate strip includes at least one pair of notches formed in an edge of the body portions thereof adapted to form an outer edge of the legs of the bifurcated backing member, said pair of notches being adapted, in use, to engage with a claw of a yoke of a wiper assembly.

7. A bifurcated backing member according to claim 6 wherein the body portions of said bifurcated backing member are displaced outwardly at a region adjacent each said notch.

* * * * *